United States Patent [19]
Hyun-Jo

[11] Patent Number: 5,806,956
[45] Date of Patent: Sep. 15, 1998

[54] SEARCHLIGHT

[76] Inventor: Lee Hyun-Jo, 657-117, Shinam-1Dong, Dong-Gu, Daegu, Rep. of Korea

[21] Appl. No.: 718,745

[22] Filed: Sep. 18, 1996

[51] Int. Cl.⁶ .................................................. F21V 21/30
[52] U.S. Cl. ............................ 362/35; 362/286; 362/385; 362/272; 362/428
[58] Field of Search .................................. 362/61, 66, 74, 362/428, 35, 272, 233, 286, 287, 429, 420, 422, 423, 427, 385

[56] References Cited

U.S. PATENT DOCUMENTS

| 4,387,362 | 6/1983 | Gosswiller | 362/35 |
|---|---|---|---|
| 4,930,057 | 5/1990 | Williams | 362/272 |
| 5,490,046 | 2/1996 | Gohl et al. | 362/286 |
| 5,580,148 | 12/1996 | Liao | 362/35 |
| 5,584,560 | 12/1996 | Gosswiller et al. | 362/35 |

*Primary Examiner*—Thomas M. Sember
*Attorney, Agent, or Firm*—Birch, Stewart, Kolasch & Birch, LLP

[57] ABSTRACT

A searchlight which comprises a cover mounted on a rotating support shaft and defining an axis of rotation, first means for rotating the support shaft containing the cover around the axis of rotation, a reflector pivotally mounted within the cover, and second means for rotating the reflector in a different direction relative to the direction of rotation of the cover.

7 Claims, 6 Drawing Sheets

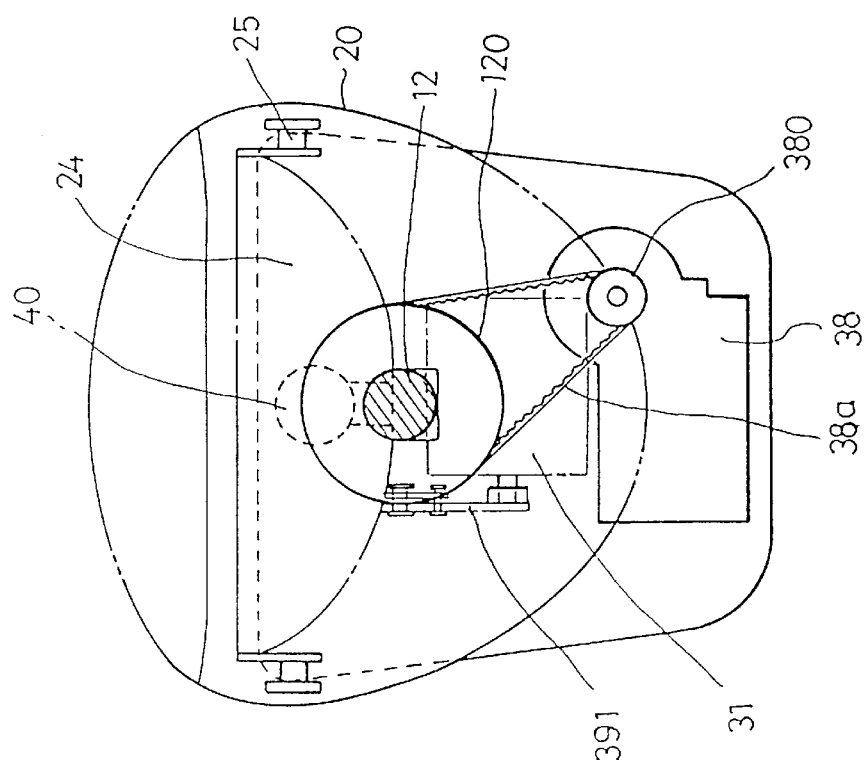
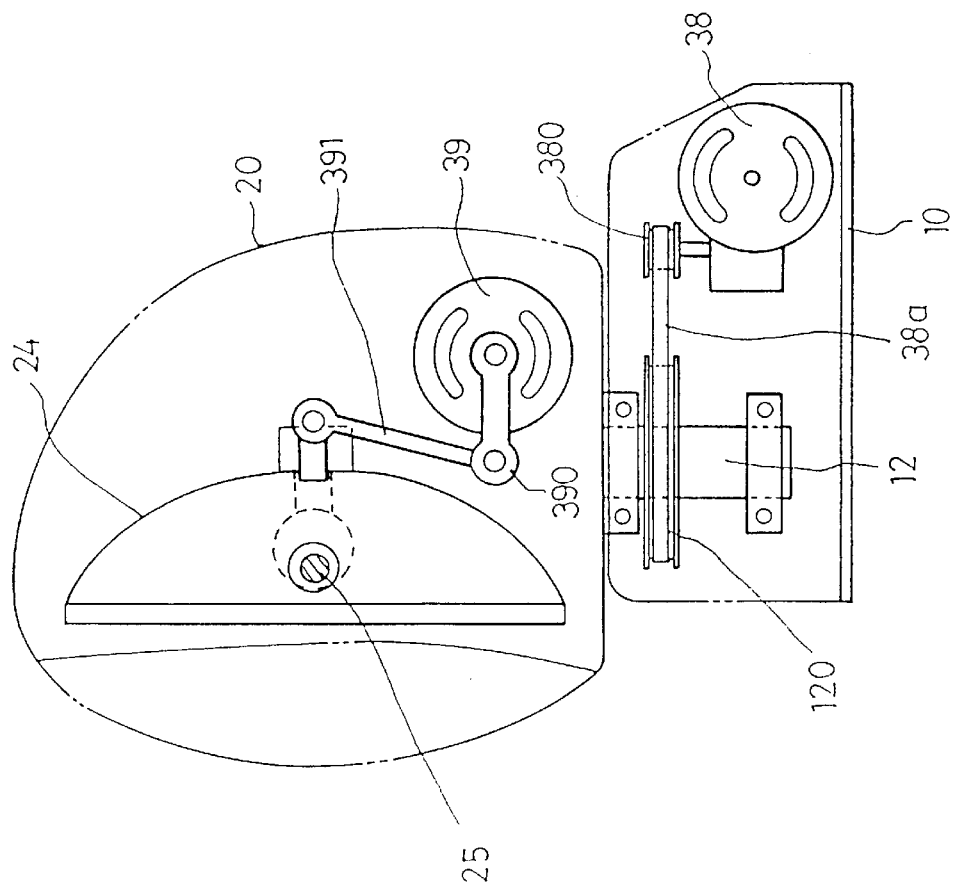

SEARCHLIGHT

BACKGROUND OF THE INVENTION

The present invention relates to a searchlight in which its angle of rotation can be readily controlled to 360 degrees in the up, down, right and left directions, and more particularly to a searchlight having multiple use functions capable of illuminating a light at all angles by moving the searchlight up, down, right and left by a manual operation, by a remote control device or by an automatic control device (programming), and capable of wide use as a searchlight for guard, army and police operations, for automobile headlights (illumination light), for floodlights used on work sites or as security lights for crime prevention in houses, plants, warehouses, farms, etc. Such searchlights are capable of providing a focused light.

Generally, the use of searchlights has had problems in that they are cumbersome to directly, manually operate since the light was rotatable in only one direction. Not only could the illuminating angle not be variously changed but also the focus of the light was always constant so that an appropriate light suitable for illuminating a particular distance could not be achieved.

SUMMARY OF THE INVENTION

The present invention is directed to solving the present problem by providing a searchlight capable of illuminating a light to a desired spot, in any direction and also capable of correctly capturing and confirming a physical object at a long distance by utilizing a focused, adjusting light device.

BRIEF DESCRIPTION OF THE DRAWINGS

The present invention will become more fully understood from the detailed description given hereinbelow and the accompanying drawings which are given by way of illustration only, and thus, are not limitative of the present invention, and wherein:

FIGS. 3(A) and 3(B) show moving mechanisms for adjusting the focus in accordance with the present invention in which FIG. 3(A) shows a rack gear form, and FIG. 3(B) shows an internal meshing gear form;

FIGS. 5(A) and 5(B) are other embodiments for operating the illuminating angle by cylinders in which FIG. 5(A) is a plane view and FIG. 5 (B) is a side view; and FIGS. 6(A) and 6(B) are further embodiments for operating the illuminating angle by a lever or a belt, in which FIG. 6(A) is a side view and FIG. 6(B) is a plane view.

DETAILED DESCRIPTION OF THE PREFERRED EMBODIMENTS

Hereinafter, the preferred embodiments of the present invention will be described in more detail with reference to the accompanying drawings.

Figure 2:
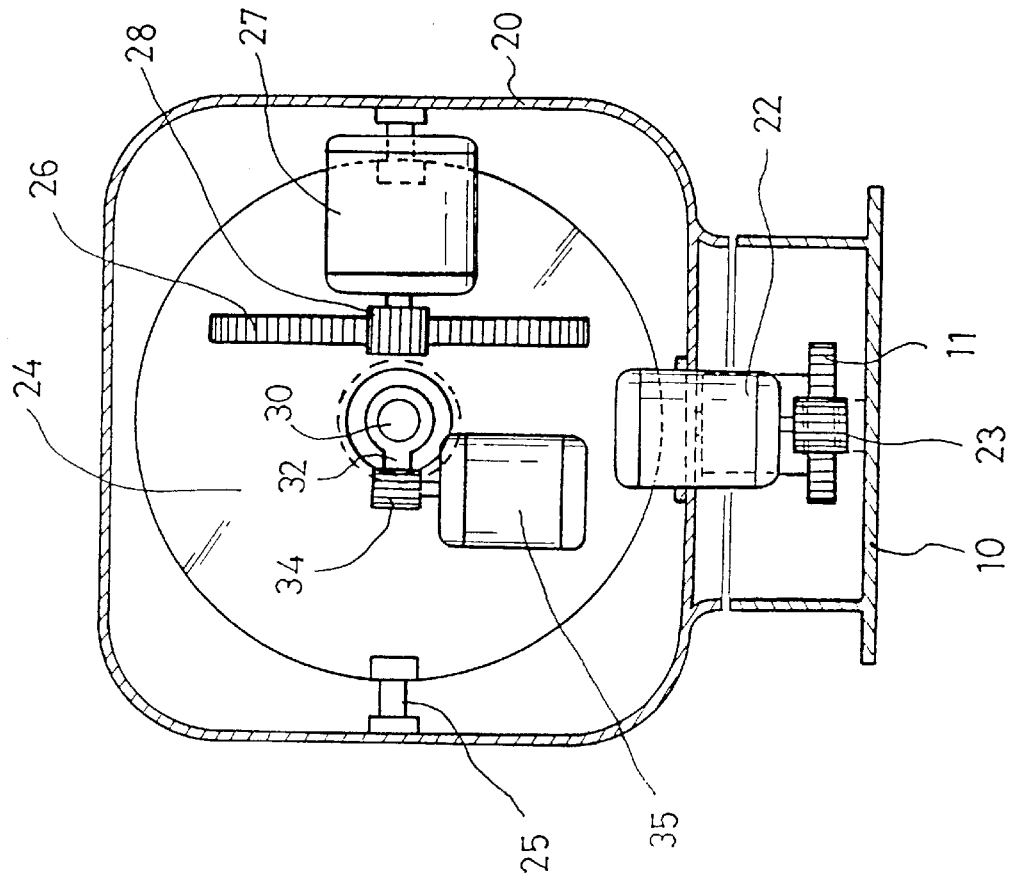
FIG. 2 is a sectional view taken along A—A' line of FIG. 1.
Figure 1:
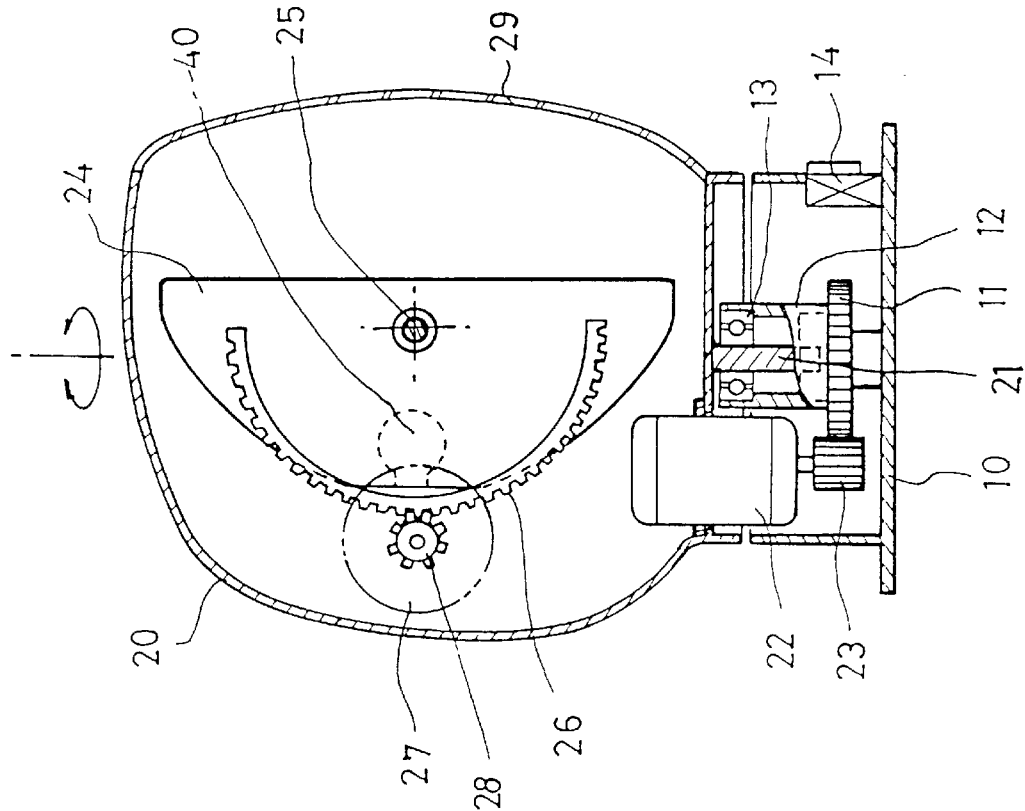
FIG. 1 is a side sectional view showing the structure of the present invention.

As shown in FIG. 1 and FIG. 2, a fixed support 12 formed with an externally meshing gear 11 is integrally fixed at the center of the base 10. The externally meshing gear 11 is meshed with a sun gear 23 attached to a right and left driving motor 22 fixed at the bottom end of a searchlight cover 20. A bearing 13 is provided at the top of the fixed support 12. The sun gear 23 rotatably engages with the external meshing gear 11 to make a right and left rotation of the searchlight cover 20 upon the operation of the right and left driving motor 22. Pivot shafts 25 for the reflector 24 are inserted into the inner wall on both sides of the cover 20, having a front window 29, for making the reflector 24 rotate. A sector gear 26 is fixed at one rear side of the reflector 24 so as to mesh with a driving gear 28 of an up and down driving motor 27. The driving motor 27 is fixed to the cover 20 so that the sector gear 26, which is fixed to the reflector 24, is rotated to up and down upon the operation of the up and down driving motor 27, whereby the rotation of the reflector is achieved.

A moving gear 31 is formed at the external circumference of a socket coupling means 30 coupled with an electric bulb at the center of the reflector 24. The moving gear 31 is meshed with a driving gear 34 of a focus driving motor 35 fixed at one side of the reflector 24 so that a focus adjustment can be made by moving the electric bulb 40 inserted in the socket coupling means 30 in the forward and rearward direction within the reflector 24 by the driving gear 34.

Figure 3A:
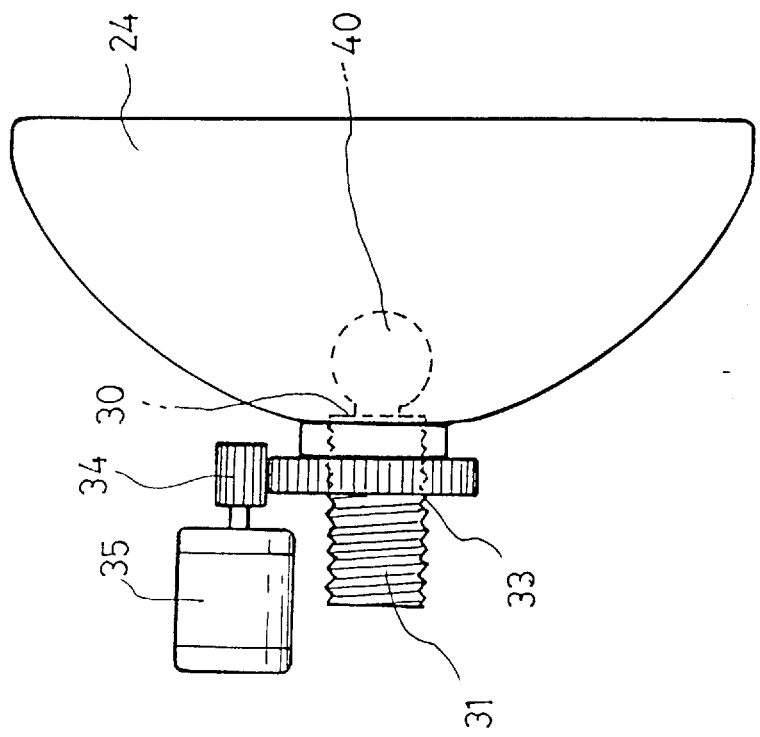
Figure 3B:
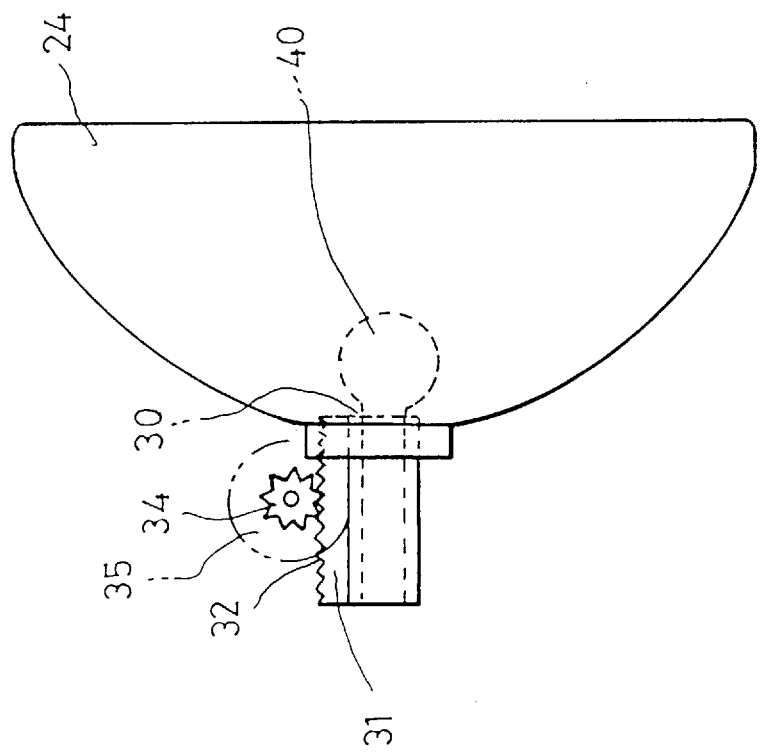

FIGS. 3(A) and 3(B) show examples in which said socket coupling means moving gear 31 is made by a rack gear 32 or an internal meshing gear 33 meshed with the driving gear 34 for moving the socket coupling means 30 in the forward and rearward direction.

Figure 4A:
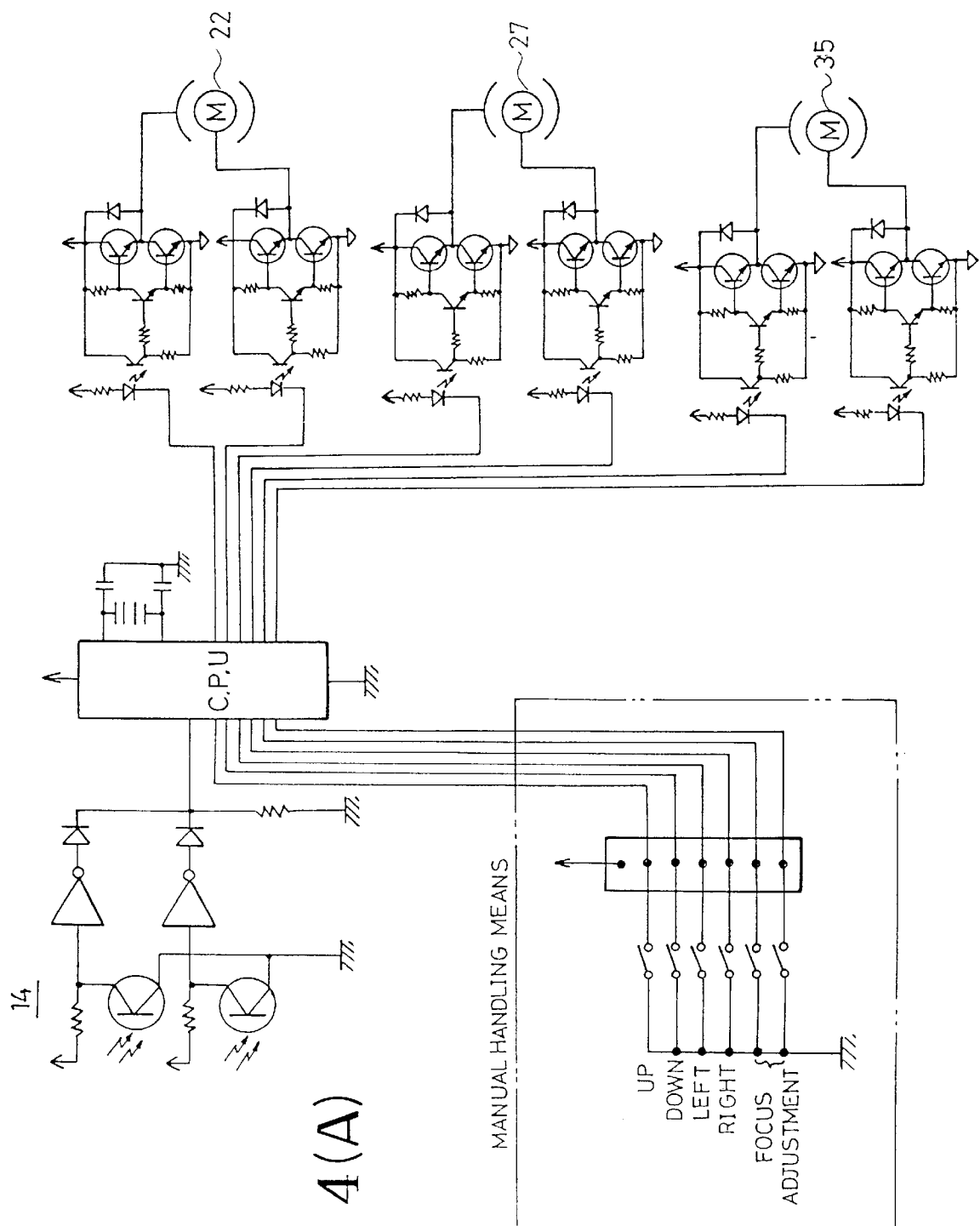
FIG. 4(A) is a circuit diagram of the configuration of the present invention.

FIG. 4(A) is a circuit diagram in which the illuminating angle or focus adjustment of the searchlight of the present invention is made by executing a remote control at a signal receiving means 14 provided with a remote control receiving means and manual handling means at one side of the base 10 and transferring this signal to a central processing unit (CPU) or manually operating the same.

Figure 4B:
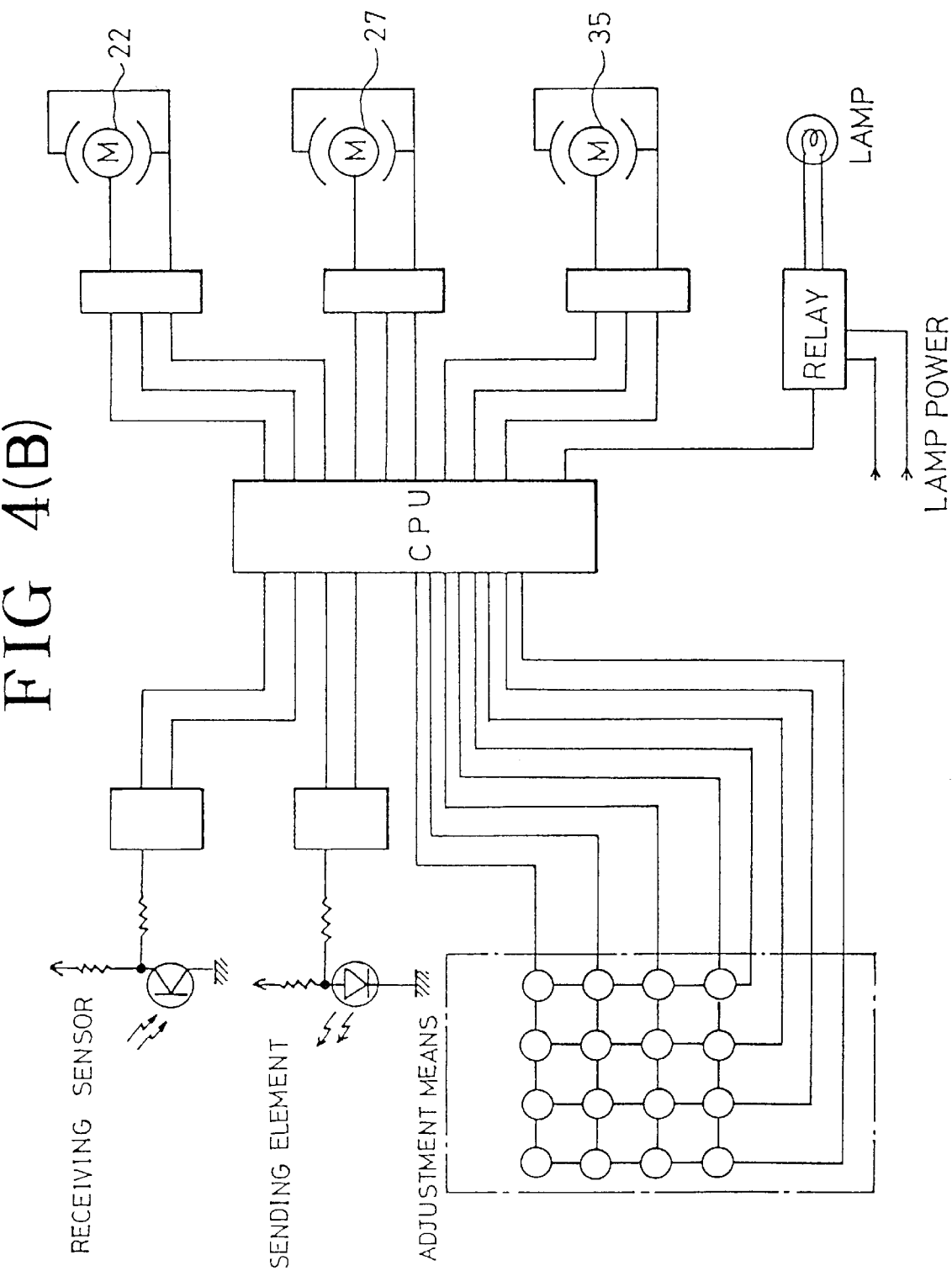
FIG. 4(B) is an automatic control circuit for the present invention.

FIG. 4(B) is a circuit diagram in which the searchlight illuminating angle or focus adjustment is programmed at the signal receiving means 14 provided at one side of the base 10 so that an automatic control is established.

Figure 5B:
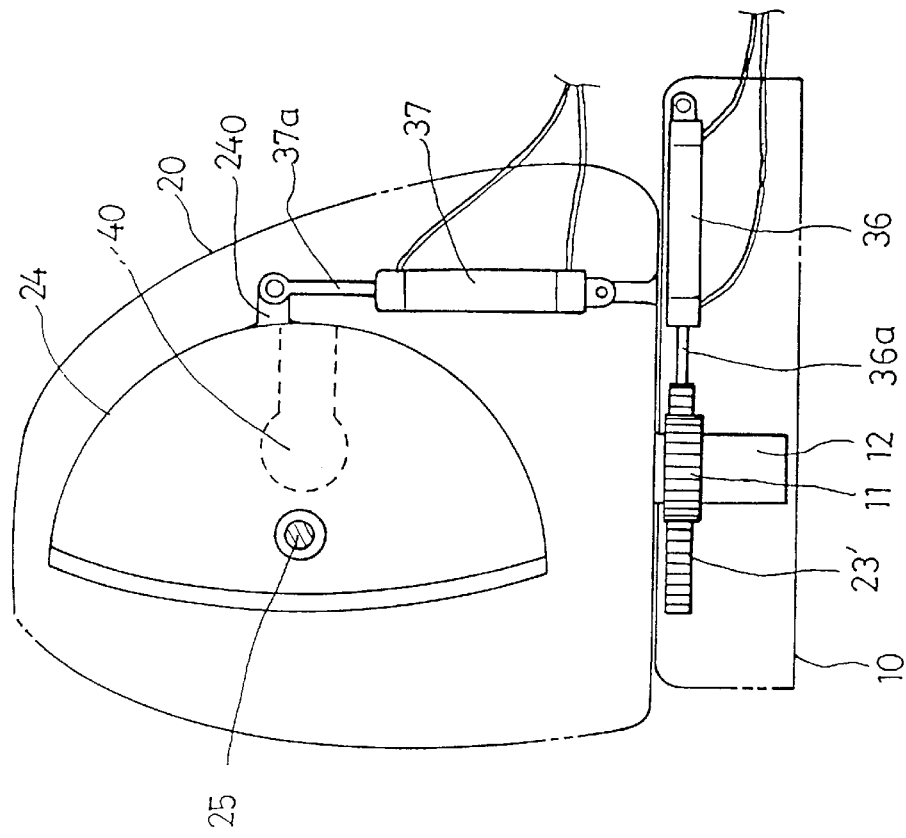
Figure 5A:
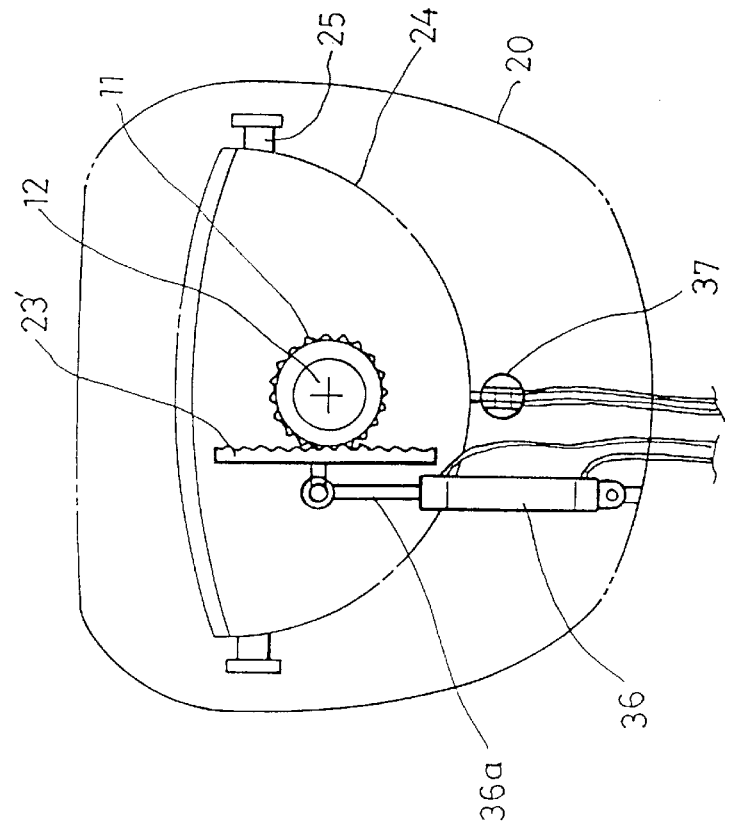

FIGS. 5(A) and 5(B) show another embodiment of the present invention for operating the illuminating angle of the searchlight with cylinders, in which a center pivot shaft 12 formed with external meshing gear 11 is integrally provided at the bottom center of the searchlight cover 20. Rotatably fixed at the top center of the base 10, the external meshing gear 11 is meshed with the rack gear 23', and the rack gear 23' is connected to the front end of a piston rod 36a of a cylinder 36 fixed to the base 10 so that a right and left rotation of the cover 20 is achieved by the operation of cylinder 36. Each pivot shaft 25 of the reflector 24 is inserted into the inner walls at both sides of the cover 20. A connecting tab 240 extends from the back of the reflector and is connected to the front end of a piston rod 37a of cylinder 37 so that the reflector 24 can be rotated in the upward and downward direction by the operation of the cylinder 37.

FIGS. 6(A) and 6(B) show still another embodiment of the present invention for operating the illuminating angle of the searchlight using a lever and a belt, in which a center rotary shaft 12 is attached with a driven pulley 120 provided at the bottom center of the searchlight cover 20 whereby rotatably the driven pulley 120, fixed at top center of the base 10, is connected by a belt 38a to a driving pulley 380 of a motor 38 fixed to the base 10 so that a right and left rotation of the cover 20 is accomplished by the operation of the motor 38. Each pivot shaft 25 of the reflector 24 is inserted at both sides of the cover 20 for rotation in the upward and downward direction. A connecting tab 240 extends from the back of the reflector 24 for connection with a crank lever 391, so that the reflector 24 can be rotated in the upward and downward direction by the operation of crank 390 which is driven by motor 39.

In accordance with the present invention as shown in FIG. 1 and FIG. 2, when the searchlight is provided with a searchlight base 10 at a predetermined place and when the right and left driving motor 22, which is integrally connected with the cover 20, is operated in order to move the searchlight in the right and left direction, the sun gear 23, which is fixed to the shaft of the driving motor 22, is rotated and simultaneously the center rotary shaft 21 of the cover 20 is rotated to a predetermined angle around the fixed support 12 of the base 10 to illuminate the searchlight in the right and left direction.

When the motor 27 fixed at one side of the cover 20 is operated for illuminating the searchlight in the upward and downward direction, the driving gear 28 fixed to the shaft of the driving motor 27 is rotated and simultaneously the sector gear 26 of the reflector 24 which is meshed therewith is moved i the upward and downward direction whereby the reflector 24 fixed to both sides of the cover 20 is rotated around the pivot shaft 25 at a predetermined angle for illuminating the searchlight in the up and down direction. Thus, the reflector 24 is rotated in the up and down direction and the cover 20 supporting the reflector 24 is rotated in the right and left direction in response to the operation state of the driving motors 27, 22, so that the illuminating angle of the searchlight can be freely controlled.

On the other hand, FIGS. 5(A) and 5(B) and FIGS. 6(A) and 6(B) show structures in which the searchlight illuminating angle controlling means are effectively the same, utilizing cylinders, and levers or belts.

Although the conventional searchlight does not provide good visibility due to a diffusion of the light upon illuminating distant objects, the present invention has the advantage of clearly seeing distant objects when utilizing the focus adjusting device for moving the electric bulb 40 in the front and back direction within the reflector 24.

The searchlight illuminating angle adjustment and the focus adjustment can be simply and conveniently operated by either a manual operation or the remote control circuit of FIG. 4(A) and an automatic (programmed) circuit.

Since the present invention can simply and conveniently control the illuminating angle of the searchlight in the up, down, right and left directions, and a focus adjustment is provided in response to the illuminating distance, the searchlight can be used for chasing criminals, for illuminating work sites or the working environment, and the like.

In the case where the searchlight is used for crime prevention in a house, plant, warehouse, farm or fishing place, a detecting device can be connected to the searchlight operating circuit whereby the illuminating angle of the searchlight is automatically controlled by a signal transferred from the detecting device to provide an illuminating light.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A searchlight which comprises a cover mounted on a rotating support shaft and defining an axis of rotation, first means for rotating the support shaft containing the cover around said axis of rotation, said first means including a first driving means connected through piston and cylinder means and gear means to said support shaft;

a reflector pivotally mounted within said cover, and second means for rotating the reflector in a different direction relative to the rotation of the cover.

2. A searchlight which comprises:

a cover mounted on a rotating support shaft and defining an axis of rotation, first means for rotating the support shaft containing the cover around said axis of rotation, a reflector pivotally mounted within said cover, and second means for rotating the reflector in a different direction relative to the rotation of the cover, said second means including a second driving means connected through piston and cylinder means and gear means to the pivotally mounted reflector.

3. A searchlight which comprises a cover mounted on a rotating support shaft and defining an axis of rotation, first means for rotating the support shaft containing the cover around said axis of rotation, a reflector pivotally mounted within said cover, said reflector containing a light source disposed at the center thereof, second means for rotating the reflector in a different direction relative to the rotation of the cover, and third means provided for moving the light source back and forth relative to the reflector.

4. The searchlight of claim 3, wherein the third means is drive means connected through gears to said light source.

5. The searchlight of claim 3, wherein the first, second, and third means are controlled through a manual operation.

6. The searchlight of claim 3, wherein the first, second, and third means are driving means operated through remote control.

7. The searchlight of claim 6, wherein the driving means is operatively associated with a program means for providing automatic control.

* * * * *